(12) United States Patent
    Cox

(10) Patent No.: US 11,390,133 B2
(45) Date of Patent: Jul. 19, 2022

(54) ANTI-ROLL BAR LINK

(71) Applicant: Christopher Cox Creative, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 0 days.

(21) Appl. No.: 17/200,727

(22) Filed: Mar. 12, 2021

(65) Prior Publication Data

US 2021/0283975 A1    Sep. 16, 2021

Related U.S. Application Data

(60) Provisional application No. 62/989,513, filed on Mar. 13, 2020.

(51) Int. Cl.
    *B60G 21/073*    (2006.01)

(52) U.S. Cl.
    CPC .... *B60G 21/073* (2013.01); *B60G 2204/4604* (2013.01); *B60G 2400/98* (2013.01)

(58) Field of Classification Search
    CPC .......... B62K 19/36; B62K 5/10; B62K 25/04; B60G 2300/45; B60G 21/007; B60G 21/0556; B60G 21/0553; F16D 13/757
    USPC ........................................................ 180/210
    See application file for complete search history.

(56) References Cited

U.S. PATENT DOCUMENTS

| | | | | |
|---|---|---|---|---|
| 5,217,245 A | * | 6/1993 | Guy ................... | B60G 21/0556 280/124.152 |
| 6,457,730 B1 | * | 10/2002 | Urbach ................ | B60G 17/08 280/5.506 |
| 6,659,475 B2 | * | 12/2003 | Clements ........... | B60G 21/0556 267/188 |
| 7,887,072 B2 | * | 2/2011 | Hauser ................ | B60G 17/005 280/124.152 |
| 7,926,820 B2 | * | 4/2011 | Taneda ............... | B60G 21/0556 188/266.2 |
| 2002/0195790 A1 | | 12/2002 | Fulks | |

(Continued)

OTHER PUBLICATIONS

International Search Report and Written Opinion received for counterpart International Application No. PCT/US2021/022228 dated Jun. 23, 2021 (16 pages).

*Primary Examiner* — Paul N Dickson
*Assistant Examiner* — Caitlin Anne Miller
(74) *Attorney, Agent, or Firm* — Perkins Coie LLP

(57) ABSTRACT

An anti-roll bar link for a vehicle suspension may be positioned between an anti-roll bar and an articulating arm. The link selectively transfers movement of the arm to the anti-roll bar, depending on a locked or unlocked state. The link includes a body interfacing a slidable shaft. A physical feature selectively locks or unlocks the slidable shaft with respect to the body. The physical feature may include a locking pin, interference with a locking ball, etc. In the locked state, translation of the slidable shaft is restricted, and movement of the arm is transferred through the link to the bar. In the unlocked state, translation of the slidable shaft is permitted, and movement of the arm causes the shaft to translate with respect to the body such that at least a portion of the movement is not transferred to the bar.

47 Claims, 15 Drawing Sheets

(56) References Cited

U.S. PATENT DOCUMENTS

| | | | |
|---|---|---|---|
| 2015/0083535 A1* | 3/2015 | Ericksen | F16F 9/46 |
| | | | 188/289 |
| 2017/0129302 A1 | 5/2017 | Jackson | |
| 2019/0054784 A1* | 2/2019 | Keuser | B60G 21/106 |
| 2019/0184784 A1* | 6/2019 | Park | F16D 11/14 |

* cited by examiner

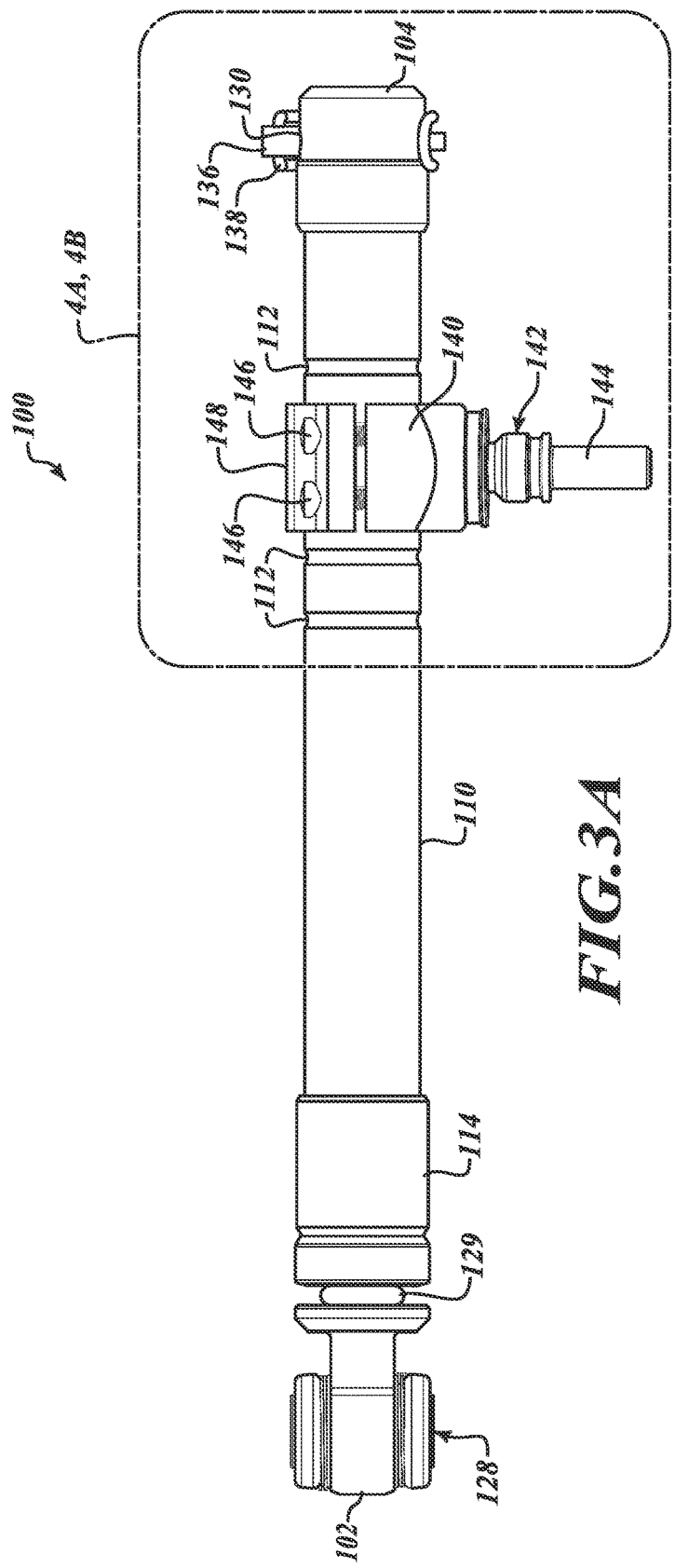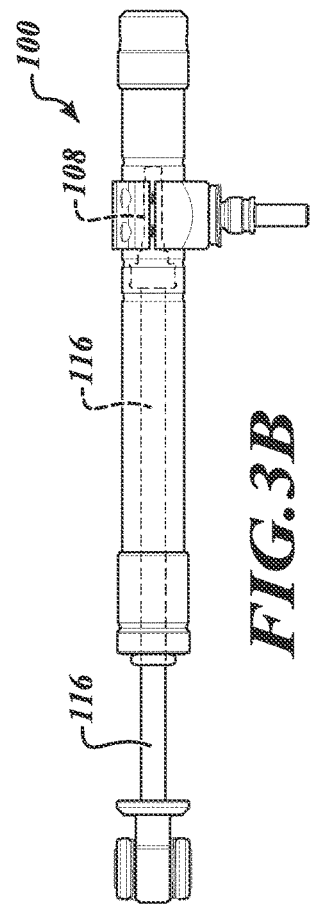
FIG.3A
FIG.3B

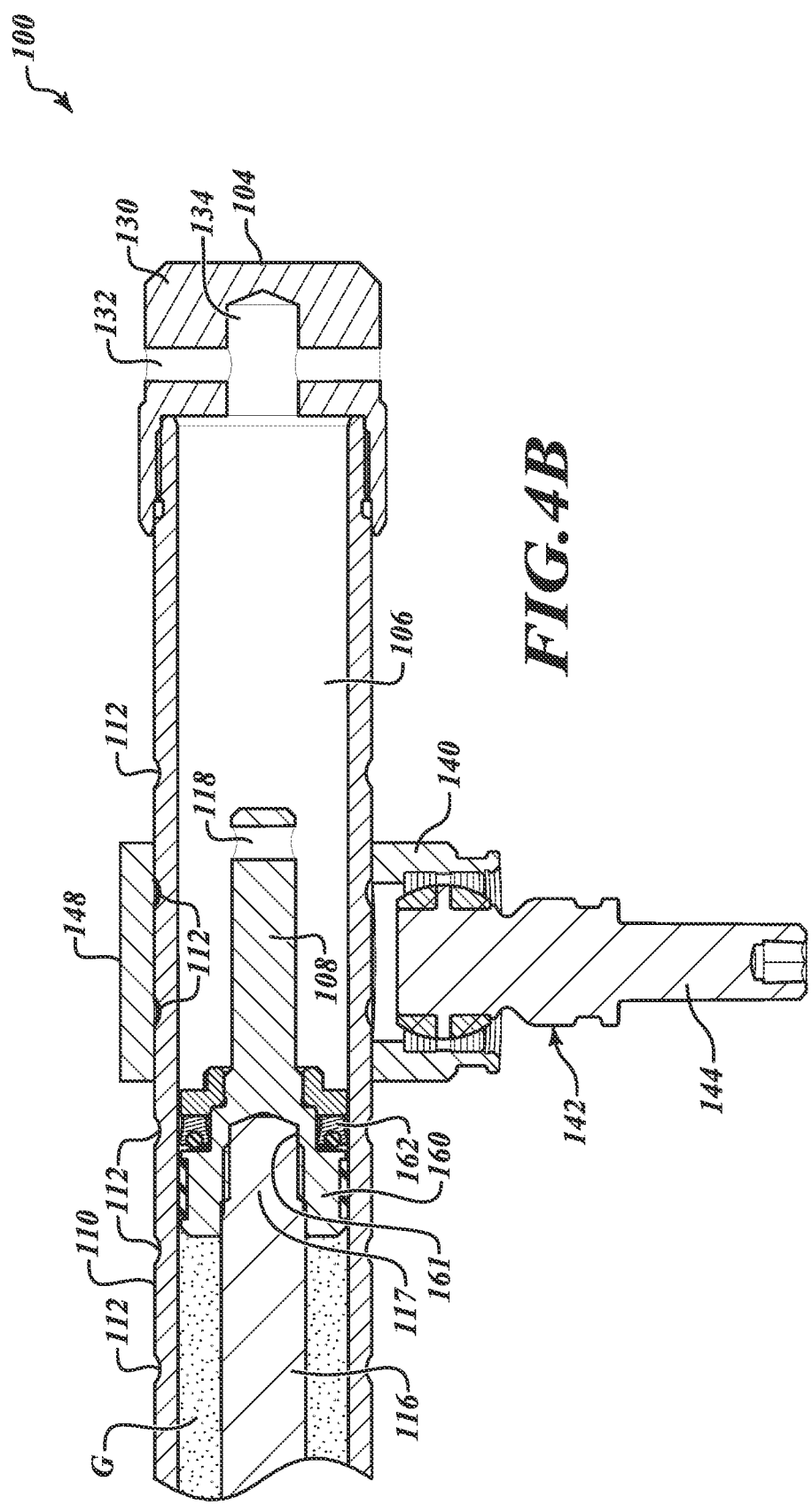

ANTI-ROLL BAR LINK

CROSS REFERENCE TO RELATED APPLICATION

The present application claims priority to U.S. Provisional Patent Application No. 62/989,513, titled "ANTI-ROLL BAR LINK," filed Mar. 13, 2020, the disclosure of which is hereby incorporated by reference in its entirety.

TECHNICAL FIELD

The present technology generally relates to an anti-roll bar link configured to selectively provide increased suspension articulation in vehicles having an anti-roll bar.

BACKGROUND

An anti-roll bar (or anti-sway bar) is a common component in automotive suspensions to help reduce the body roll of a vehicle during cornering and other dynamic events causing suspension articulation. In general, an anti-roll bar is connected between the suspension assemblies of the left and right side of a vehicle to transfer an amount of articulation between the sides. In some configurations, both front and rear anti-roll bars are used on a four-wheel vehicle. The anti-roll bar provides compensation to the suspension on one side of the vehicle when the suspension on the other opposing side is articulated, e.g. compressing the left rear wheel suspension when the right rear wheel suspension is compressed through vehicle cornering and/or traveling over road irregularities. In this regard, the anti-roll bar can work to compress or extend the suspension of the opposite side of the vehicle to maintain the left and right side at similar heights.

In such anti-roll bar configurations, when one side of the suspension articulates, the anti-roll bar system imparts a torsional force through the bar and links to the other side of the connected suspension components. FIG. 1 shows a conventional anti-roll bar configuration having a bar 1, a rigid link 2 connecting the bar 1 to an axle 3, and a spring 4 providing counter-resistance to input compression forces. For clarity, other common components of the suspension and vehicle systems have been omitted. In these conventional configurations, the links connecting the anti-roll bar to the suspension components are generally rigid, such that the torsional forces of the bar are directly transferred to the suspension components during articulation. In some road configurations, such as rough or broken pavement, anti-roll bars can produce jarring side-to-side body motions (a "waddling" sensation), which increase in severity with the diameter and stiffness of the anti-roll bar. Further, excessive role stiffness, which is typically a result of overly aggressive anti-roll bar setups, can cause the inside wheels to lift off the ground during hard cornering and other suspension articulation maneuvering.

Disconnecting the anti-roll bars may be desirable in certain situations where high-articulation of the suspension is beneficial, such as off-road or when traversing rugged terrain. When the anti-roll bars are disconnected, the suspension at each corner of the vehicle can articulate to a larger extent since the forces acting on the wheel in any given corner of the vehicle are imparted into only the suspension components in that corner. During off-road use, such increased articulation may improve the ability of the vehicle to traverse rugged terrain; however, vehicles can become unstable with the anti-roll bars disconnected, and are typically only usable at very low vehicle speeds due to undamped side-to-side motion.

SUMMARY

In accordance with one embodiment of the present technology, an anti-roll bar link for a vehicle suspension is provided. The anti-roll bar link can be switched between different states, such as a locked state, an unlocked state, etc. In the locked state, the anti-roll bar link can function as a fixed-length link coupled to a suspension arm and an anti-roll bar. In the unlocked state, the anti-roll bar link can extend to increase suspension travel. For example, the anti-roll bar links can be in the locked state when traveling along paved roads and can be in the unlocked state when off-roading or traversing rugged terrain. The anti-roll bar links can include manually accessible control elements used to change the state of the links when the vehicle (e.g., truck, car, dune buggy, all-terrain vehicle, off-road vehicle, etc.) is stationary. This allows the front suspension to operate differently than the rear suspension. For example, front anti-roll bar links can be set to a first setting while rear anti-roll bar links can be set to a second setting, which may be different from the first setting. In other modes, each anti-roll bar link can be set to the same setting. In some embodiments, the anti-roll bar links can be in communication a controller (e.g., an electronic control unit, a suspension controller, etc.) programmed to change the state of one or more of the anti-roll bar links on the fly while seated in or otherwise operating the vehicle. The controller can also coordinate operation of the anti-roll bar links and the suspension system based on one or more sensor inputs (e.g., an adaptive suspension system, a semi-active suspension system, etc.).

In accordance with one embodiment of the present technology, an anti-roll bar link for a vehicle suspension is provided. The anti-roll bar link generally includes an elongate body having a proximal end portion and an inner chamber extending to the proximal end portion, a shaft configured to be received within the inner chamber and axially translate with respect to the body, and a piston coupled to an end of the shaft such that axial translation of the shaft causes the piston to travel along the inner chamber. The anti-roll bar link may further include a locking protrusion extending from the end of the shaft and away from the piston toward the proximal end portion of the body, the locking protrusion having a proximal tip and a locking aperture extending transversely through the proximal tip, wherein the locking aperture may be positioned to receive a locking pin and lock the axial position of the shaft with respect to the body.

In accordance with another embodiment of the present technology, an anti-roll bar link for a vehicle suspension is provided. The anti-roll bar link generally includes an elongate body having an inner chamber extending axially along the body and an enlarged chamber positioned near a proximal end portion of the body, the enlarged chamber having a sloped surface, a shaft configured to be received within the inner chamber and axially translate with respect to the body, and a retainer guide coupled to an end of the shaft and having a ball aperture. The anti-roll bar link may further include a locking ball radially movable in the ball aperture with respect to the retainer guide, wherein the locking ball may be configured to selectively engage with the sloped surface of the enlarged chamber in a parked position of the anti-roll bar link to lock the axial position of the shaft with respect to the body.

In accordance with another embodiment of the present technology, an anti-roll bar link for a vehicle suspension is provided. The anti-roll bar link generally includes an elongate body having an inner chamber extending axially along the body, a shaft assembly configured to be received within the inner chamber and to axially translate with respect to the body, the shaft assembly configured to slidably contact the elongate body such that a distal portion of the inner chamber contains pressurized fluid, and a cap assembly coupled to a proximal end of the elongate body. The cap assembly may have a locked configuration for fixedly holding the shaft assembly and unlocked configuration for allowing the shaft assembly to travel along the inner chamber such that the pressurized fluid provides dampening. The cap assembly may be spaced apart from an anti-roll bar mount region of the elongate body such that the cap assembly is manually accessible and reconfigurable between the locked configuration and the unlocked configuration when installed.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

FIG. 3A is a right-side elevation view of an anti-roll bar link in accordance with an embodiment of the present technology.

FIG. 3B is a partially transparent right-side elevation view of the anti-roll bar link of FIG. 3A, showing internal component detail of a shaft of the anti-roll bar link.

FIG. 4B is a cross-sectional right-side elevation detail view of the anti-roll bar link of FIG. 3A, showing the link in an unparked position and an unlocked state.

DETAILED DESCRIPTION

Figure 1:
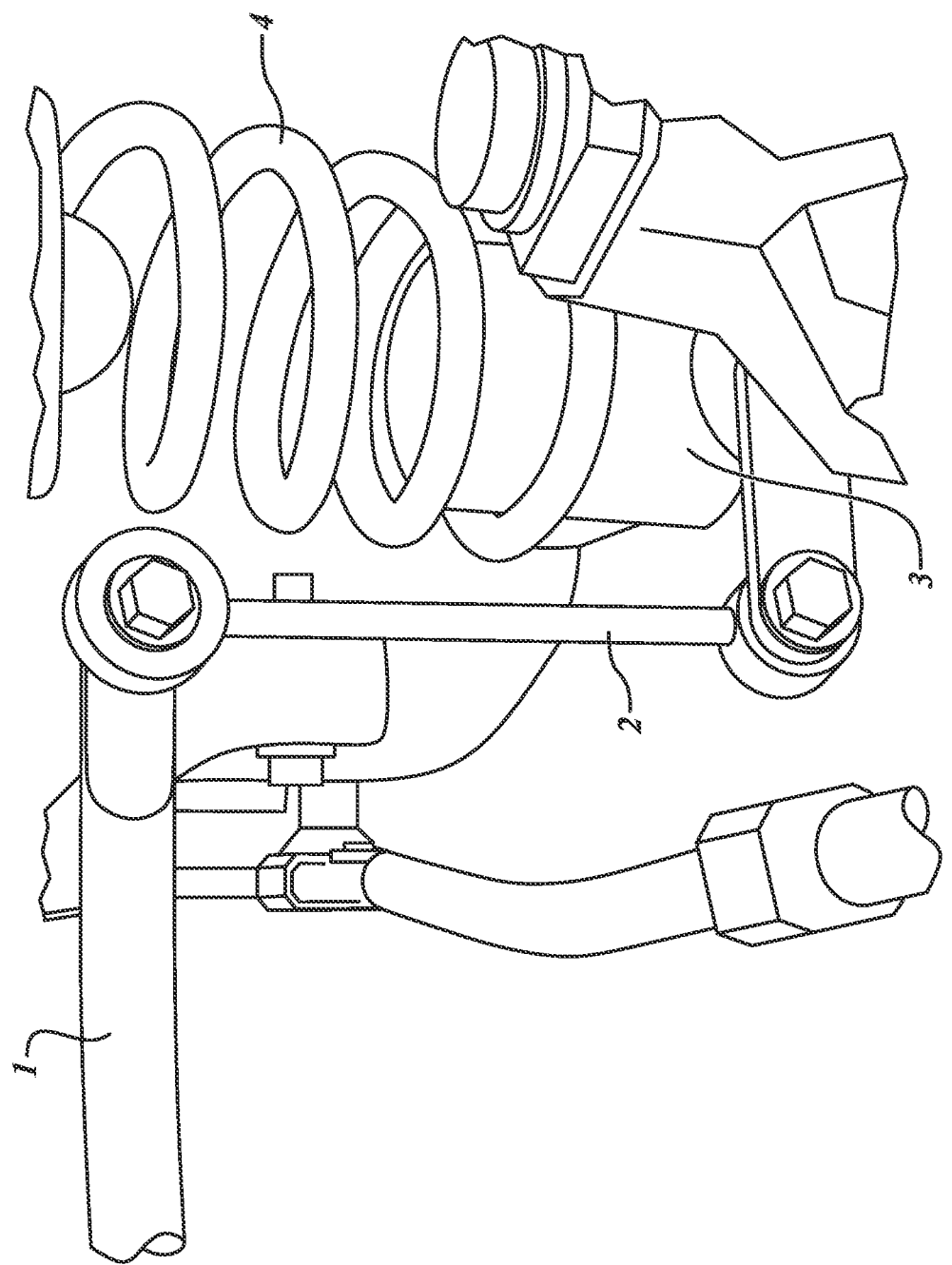
FIG. 1 is an environmental view of an anti-roll bar system configured in accordance with existing technology.

The detailed description set forth below in connection with the appended drawings, where like numerals reference like elements, are intended as a description of various embodiments of the present technology and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

The following description provides several examples that relate to anti-roll bar configurations used in automotive suspensions. The embodiments of the anti-roll bar link described herein generally include features to provide selectable relative motion between the anti-roll bar and the vehicle suspension. Unlocking the anti-roll bar links can provide the aforementioned advantages of a substantially disconnected anti-roll bar, by increased articulation of the suspension during off-road and other uses. In some embodiments, the anti-roll bar link of the present technology is configured for use with original equipment anti-roll bars, such that a user can install and gain the advantages of the anti-roll bar links without replacing various other suspension or anti-roll bar system components. As will be explained in greater detail below, the anti-roll bar link includes adjustability in the mounting features to adapt the link to different vehicle's suspension configurations.

Embodiments of the anti-roll bar link can include: (1) a locked state, where the link is substantially rigid and does not allow relative movement between the anti-roll bar and the suspension components; (2) an unlocked state, where the link is configured to readily extend and retract to allow relative movement between the anti-roll bar and the suspension components; (3) a parked position, where the link is substantially retracted, which may correspond to the position where the link can be transitioned to a locked state; and (4) an unparked position, where the link is at any point in the range of motion of the shaft of the link other than the parked position. In the illustrated embodiments described herein, the anti-roll bar link is shown with the parked position corresponding to a position where the shaft is fully retracted within the link; however, the parked position may be any position along the range of translation of the shaft, including fully extended or any intermediate position therebetween. The anti-roll bar link may include a manual toggle switch or selector cap used to transition the link between the locked state and the unlocked state, e.g., a lever, switch, pin, etc. configured for manipulation by a user of the link. In other embodiments, the anti-roll bar link may include an automated feature to transition the link between the locked stated the unlocked state, e.g., an electronic or pneumatic actuator, or other suitable toggling system. See, e.g., U.S. patent application Ser. No. 16/660,607 (filed Oct. 22, 2019, titled "Hydraulic Anti-Roll Bar Link"), which is incorporated by reference herein in its entirety and describes various anti-roll bar links that include hydraulic locking and/or damping with electronic and/or pneumatic actuators.

Figure 2:
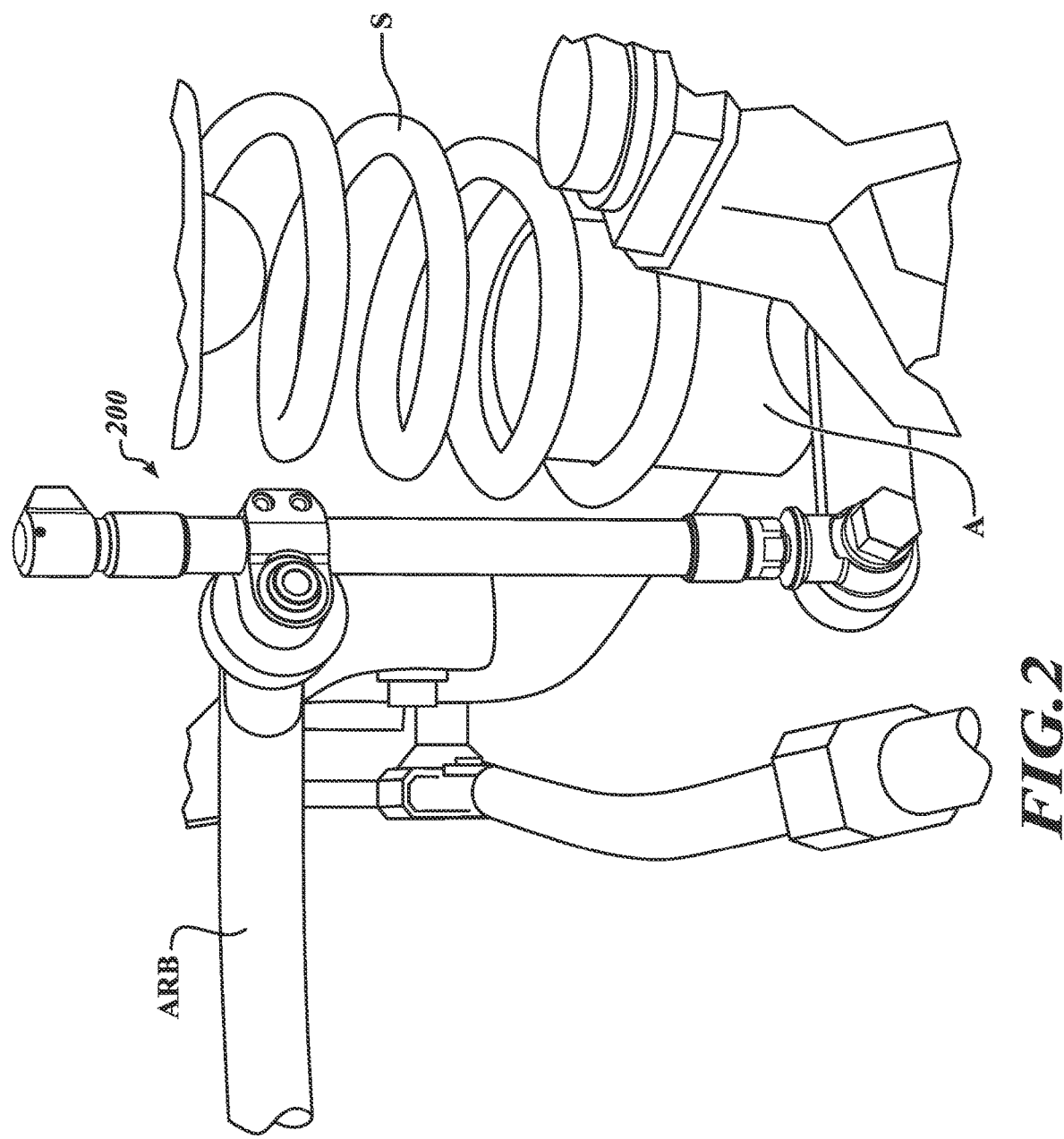
FIG. 2 is an environmental view of an anti-roll bar system having an anti-roll bar link configured in accordance with an embodiment of the present technology.

FIG. 2 is an environmental view of an anti-roll bar assembly having an extendable anti-roll bar link 200 connected between an anti-roll bar ARB and an axle or control arm A of a vehicle suspension. The suspension generally includes a spring S to provide counter-resistance to input compression forces. Although FIG. 2 shows the anti-roll bar link 200 as an example of an environmental installation, any embodiment of the anti-roll bar link disclosed herein (e.g., an anti-roll bar link 100) may be used in the environmental installation. The anti-roll bar link 200 is shown in one orientation with the selector cap nearer the anti-roll bar ARB; however, in other embodiments, the anti-roll bar link 200 is configured for use in the opposite orientation, with the selector cap nearer the axle A. The configuration of the anti-roll bar link 200 can be selected based on the configuration of the suspension system (e.g., for user access to the selector cap, suspension geometry, damage protection, corrosion, etc.).

FIGS. 3A and 3B show right-side elevation views of an embodiment of the anti-roll bar link 100, having a distal end 102, a proximal end 104, and an elongate body 110. The anti-roll bar link 100 may include a distal cap 114 positioned at the distal end 102 and a proximal cap 130 positioned at the proximal end 104 of the anti-roll bar link 100. The distal cap 114 and the proximal cap 130 may be configured to seal the proximal and distal ends of the body 110 such that gas or fluid within an inner chamber 106 (see FIG. 4A) does not leak into the atmosphere and contaminants do not enter the inner chamber 106.

The body 110 may include one or more circumferential indentations, (e.g., positioning features 112), each configured to interface with a fastener 146 of a proximal mount 140 to lock the axial location of the proximal mount 140 with respect to the body 110. The proximal mount 140 may be used to mount the anti-roll bar link 100 to the anti-roll bar ARB, the axle A, or any other suitable feature of the anti-roll bar assembly. When the proximal mount 140 is assembled to the body 110, a clamping force locks the radial position of the proximal mount 140 with respect to the body 110 and the fasteners 146 are positioned within the positioning features 112 to provide a mechanical interference retaining the axial position of the proximal mount 140 in instances where the fasteners 146 are inadvertently loosened but remain in position. In other embodiments, the proximal mount 140 is coupled to the body 110 using any suitable coupling, such as by clamping, welding, adhesive, press-fit, etc., and the positioning features 112 may be omitted from the body 110 (see, e.g., the anti-roll bar link 200 of FIG. 5).

The proximal mount 140 may include a ball joint assembly 142 (see FIG. 4A) to provide positional articulation of a mounting stud 144 for mounting the proximal mount 140 to a component of the anti-roll bar assembly (e.g., the anti-roll bar ARB, the axle A, etc.), and for accommodating suspension articulation. Other mounting configurations besides the mounting stud 144 are within the scope of the present technology. In some embodiments, the proximal mount 140 has a clamshell configuration and includes an opposable mounting cap 148. The proximal mount 140 may be formed from a single piece configured for installation on the body 110, for example, prior to installing a proximal end cap 114 on the body 110. In other embodiments, the proximal mount is located at the proximal end 104, and can be any suitable mount, such as a mounting bushing, a spherical eyelet, a mounting stud, etc. In these embodiments, the proximal mount 140 may be omitted, and the proximal end 104 of the anti-roll bar link 100 is coupled to the vehicle suspension using such mounts.

The distal end 102 of the body 110 may include a mounting bushing assembly 128 coupled to the end of a shaft 116 (see FIG. 3B) for mounting the distal end 102 of the anti-roll bar link 100 to another component of the anti-roll bar assembly (e.g., the other of the anti-roll bar ARB, the axle A, etc., opposite the mounting stud 144 or other proximal mount). Although the distal end 102 is shown with a mounting bushing assembly 128, in other embodiments, any suitable mounting configuration is within the scope of the present technology, e.g., a spherical eyelet, a mounting stud, etc. In some embodiments, an elastomeric bumper 129 is positioned between the mounting bushing assembly 128 at the distal end 102 and the body 110 to prevent impact of components of the anti-roll bar link 100 during use. In this regard, the elastomeric bumper 129 may reduce noise (e.g., clicking, creaking, squeaking, etc.) during operation of the vehicle.

Figure 4A:
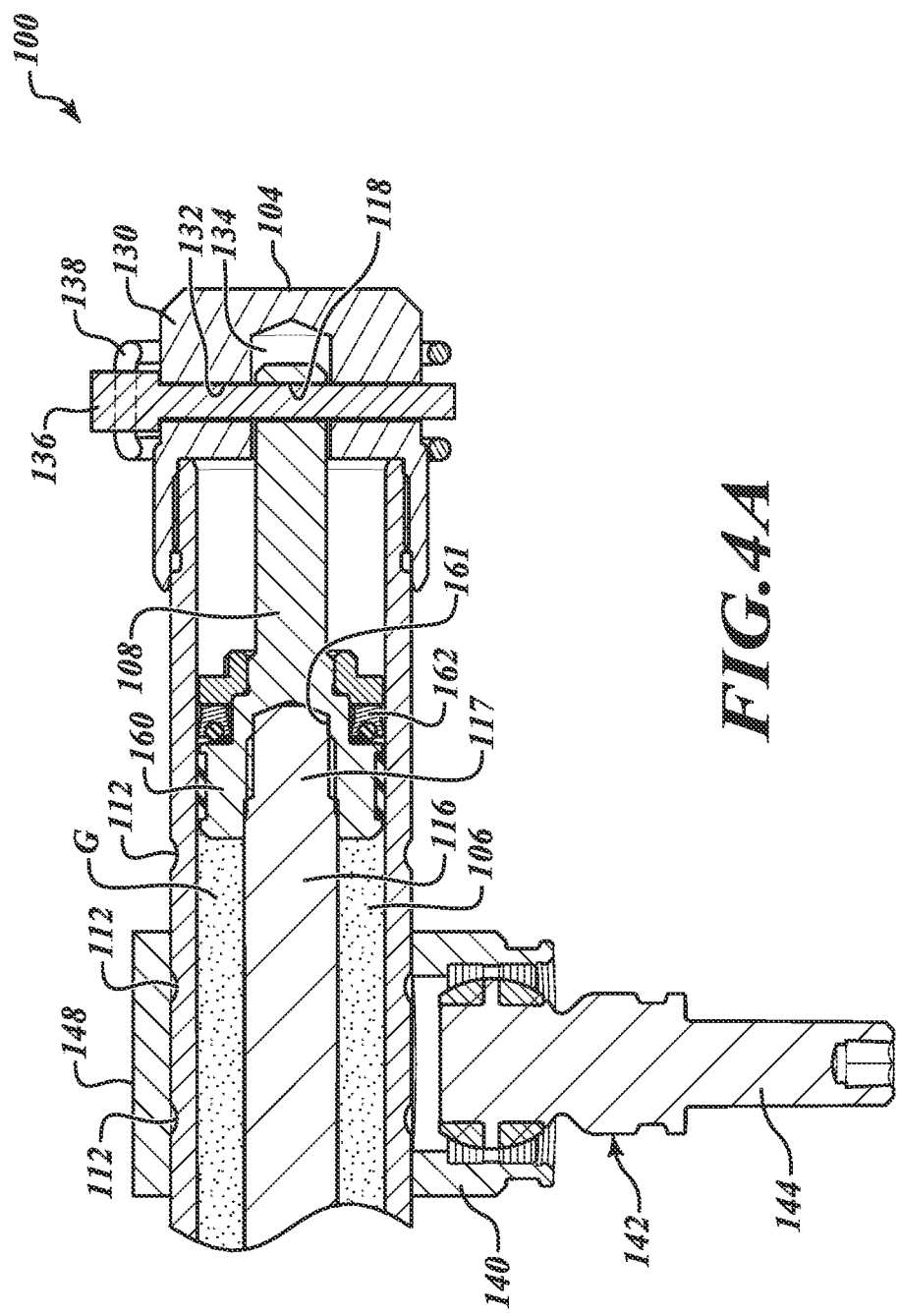
FIG. 4A is a cross-sectional right-side elevation view of the anti-roll bar link of FIG. 3A, showing the link in a parked position and a locked state.

FIGS. 4A and 4B show enlarged cross-sectional detail views of the anti-roll bar link 100 in a parked position (FIG. 4A) and an unparked position (FIG. 4B). The anti-roll bar link 100 generally includes the shaft 116 and a fixed piston 160, which is coupled to a proximal end of the shaft 116. As shown, the shaft 116 may be configured to axially travel within an inner chamber 106. The fixed piston 160 may include a chamber wall seal 162 to prevent gas in the inner chamber 106 from flowing between the proximal and distal sides of the fixed piston 160. In embodiments utilizing hydraulic damping, the chamber wall seal 162 may be omitted and the fixed piston 160 may include one or more ports (not shown) to allow damping fluid flow between the proximal and distal sides of the fixed piston 160.

As best seen in FIG. 4A, the anti-roll bar link 100 may include a locking protrusion 108 extending from the proximal end of the shaft 116 and may be coupled to the fixed piston 160. In some embodiments, the locking protrusion 108 is a shaft coupled to or integrally formed with the piston 160 and can include a recessed region 161 configured to receive a complementary shaped proximal end 117 of the shaft 116. The locking protrusion 108 is configured to interface with a locking feature, e.g., a locking pin 136, to prevent or limit the travel of the shaft 116 within the body 110. The locked state of the anti-roll bar link 100 can create a substantially rigid link between the anti-roll bar ARB and the axle A (see FIG. 2). The proximal cap 130 may include a mounting feature to mount the anti-roll bar link 100 to a suspension component of the anti-roll bar system, such as an eyelet (not shown). In other embodiments, any suitable mounting feature for the anti-roll bar link 100 may be used at the proximal end 104. In embodiments where the proximal cap 130 includes a mounting feature for the proximal end 104 of the anti-roll bar link 100, the proximal mount 140 may be omitted.

To facilitate the locked state of the anti-roll bar link 100, the proximal cap 130 may include a pin aperture 132 configured to align with a locking aperture 118 extending transversely through a tip of the locking protrusion 108 when the shaft 116 is in a parked position (FIG. 4A). To provide clearance for such alignment, the proximal cap 130 may include a locking cavity 134 in fluid communication with the inner chamber 106 and configured to at least partially receive the distal end of the locking protrusion 108 and allow the locking aperture 118 to align with the pin aperture 132 such that the locking pin 136 can be inserted. As shown, to place the anti-roll bar link 100 in a locked state, the locking pin 136 is inserted into one side of the pin aperture 132, through the locking aperture 118, and into the other side of the pin aperture 132. The locking pin 136 may include any suitable retention feature, such as a clip 138 (see FIG. 3A) that mechanically grips a portion of the anti-roll bar link 100, a detent on the locking pin 136 (e.g., a spring loaded ball, not shown), a twist-to-lock feature, a cotter pin, manually retractable interference protrusions (e.g., button release protrusions, etc., not shown).

To transition the anti-roll bar link 100 to an unlocked state and allow increased suspension articulation (as described above), the locking pin 136 may be removed from the locking aperture 118 such that the shaft 116 can extend from a distal end 102 and translate the fixed piston 160 along the inner chamber 106. The portion of the inner chamber 106 on the distal side of the fixed piston 160 may be pressurized with a gas G and configured to provide a restoring force to urge the shaft 116 toward the proximal end 104 to the parked position such that the locking aperture 118 aligns with the pin aperture 132. The portion of the inner chamber 106 positioned between the fixed piston 160 and the proximal cap 130 may be filled with low-pressure gas (e.g., air) so as to not impede parking of the anti-roll bar link 100 (a position with the shaft 116 fully retracted). To ensure the return of the shaft 116 to the parked position is not impeded, the proximal cap 130 may be vented to the atmosphere to prevent an increase in pressure in the portion of the inner chamber 106 between the fixed piston 160 and the proximal cap 130. The distal end of the shaft 116 may be coupled to the mounting bushing assembly 128 using threads or other suitable mechanical coupling features. In an unlocked state of the link 100, the shaft 116 travels in and out of the inner chamber 106 during articulation of the vehicle suspension. A shaft seal (not shown) may be positioned within or near the distal cap 114 to prevent leakage of gas or fluid at the distal end of the body 110.

In other embodiments, the inner chamber 106 may include a damping fluid permitted to flow between the proximal and distal sides of the fixed piston 160 through a plurality of ports (not shown). In these embodiments, the shaft 116 may be urged toward the proximal end 104 by a force applied to the anti-roll bar ARB to return the anti-roll bar link 100 to the parked position such that the locking pin 136 can be inserted into the pin aperture 132 and the locking aperture 118. Such a parking force may be applied by a coil spring, air spring, weight, hydraulic actuator, electric actuator, force generator, etc. positioned between a component of the vehicle, suspension, and/or anti-roll bar system and the anti-roll bar ARB. Once the shaft 116 returns to the parked position, the locking pin 136 may be reinserted to return the anti-roll bar link 100 to the locked state. If included, the pressurized gas G on the distal side of the fixed piston 160 may also provide a damping effect in the extension direction of the anti-roll bar link 100.

Figure 5:
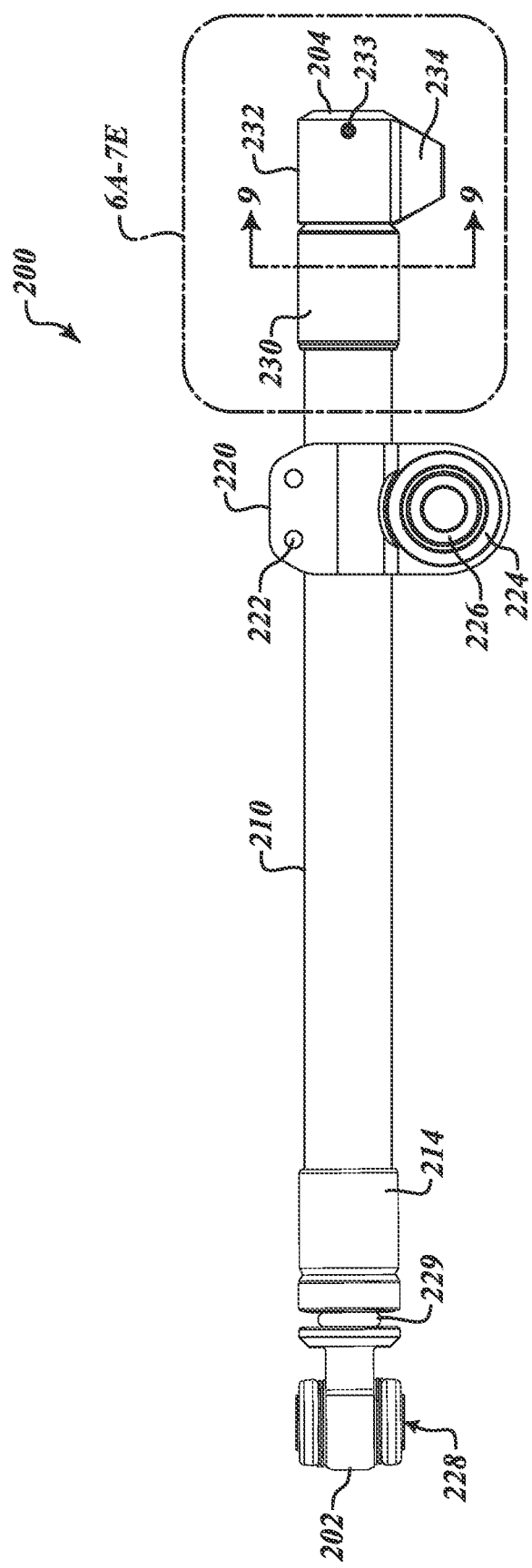
FIG. 5 is a right-side elevation view of an anti-roll bar link in accordance with another embodiment of the present technology.

FIG. 5 shows a right-side elevation view of an anti-roll bar link 200, having a distal end 202, a proximal end 204, and a body 210 in accordance with another embodiment of the present technology. Certain components of the anti-roll bar link 200 are similar to components of the anti-roll bar link 100. The similar components have like reference numerals, except are denoted in the 200-series instead of the 100-series, unless otherwise noted. In this regard, certain components of the anti-roll bar link 200 may not be reintroduced for clarity and conciseness in the ensuing description.

The anti-roll bar link 200 may include a distal cap 214 positioned at the distal end 202 and a proximal cap 230 positioned at the proximal end 204 of the anti-roll bar link 200. The distal cap 214 and the proximal cap 230 may be configured to at least partially seal the proximal and distal ends of the body 210 such that gas or fluid within an inner chamber 206 (see FIG. 6A) does not leak into the atmosphere and contaminants do not enter the inner chamber 206. The distal cap 214 and the proximal cap 230 may be coupled to the anti-roll bar link 200 with any suitable mechanical coupling (e.g., threads, press fit, etc.). Certain components of the anti-roll bar link 200 are shown with overlapping material in the Figures having cross-sectional views, which is intended to represent areas where threads or other features can be added for a mechanical connection. The proximal end of the body 210 may include a selector cap 232 rotatably associated with the proximal cap 230 and configured to transition the anti-roll bar link 200 between locked and unlocked states. In this regard, the selector cap 232 may include a rotation protrusion 234 projecting from the selector cap 232 to provide leverage for a user to transition the anti-roll-bar link 200 between locked and unlocked states by rotating the selector cap 232.

The proximal end of the body 210 may also include a proximal mount 220 that can be assembled to the body 210 using fasteners (not shown) through apertures 222 to apply a clamping force to lock the axial and radial position of the proximal mount 220 with respect to the body 210. In other embodiments, the proximal mount 220 is coupled to the body 210 using any suitable coupling, such as by clamping, welding, adhesive, press-fit, etc., or may include positioning features (e.g., similar to the positioning features 112, described above). The proximal mount 220 may include a bushing 224 to provide a degree of freedom for accommodating suspension articulation in the proximal mount 220 when assembled to a component of the anti-roll bar assembly (e.g., the anti-roll bar ARB, the axle A, etc.). Other mounting configurations besides the proximal mount 220 and the bushing 224 are within the scope of the present technology. In some embodiments, the proximal mount 220 may have a clamshell configuration and/or include an opposable mounting cap, and can be any suitable mount, such as a mounting bushing, a spherical eyelet, a mounting stud, etc.

The distal end 202 of the body 210 may include a mounting bushing assembly 228 coupled to the end of a shaft 216 (see FIG. 6A) for mounting the distal end 202 of the anti-roll bar link 200 to another component of the anti-roll bar assembly (e.g., the other of the anti-roll bar ARB, the axle A, etc., opposite the proximal mount 220). Although the distal end 202 is shown with a mounting bushing assembly 228, in other embodiments, any suitable mounting configuration is within the scope of the present technology, e.g., a spherical eyelet, a mounting stud, etc. In some embodiments, an elastomeric bumper 229 is positioned between the mounting bushing assembly 228 at the distal end 202 and the body 210 to prevent impact of components of the anti-roll bar link 200 during use. In this regard, the elastomeric bumper 229 may reduce noise (e.g., clicking, creaking, squeaking, etc.) during operation of the vehicle.

Figure 6A:
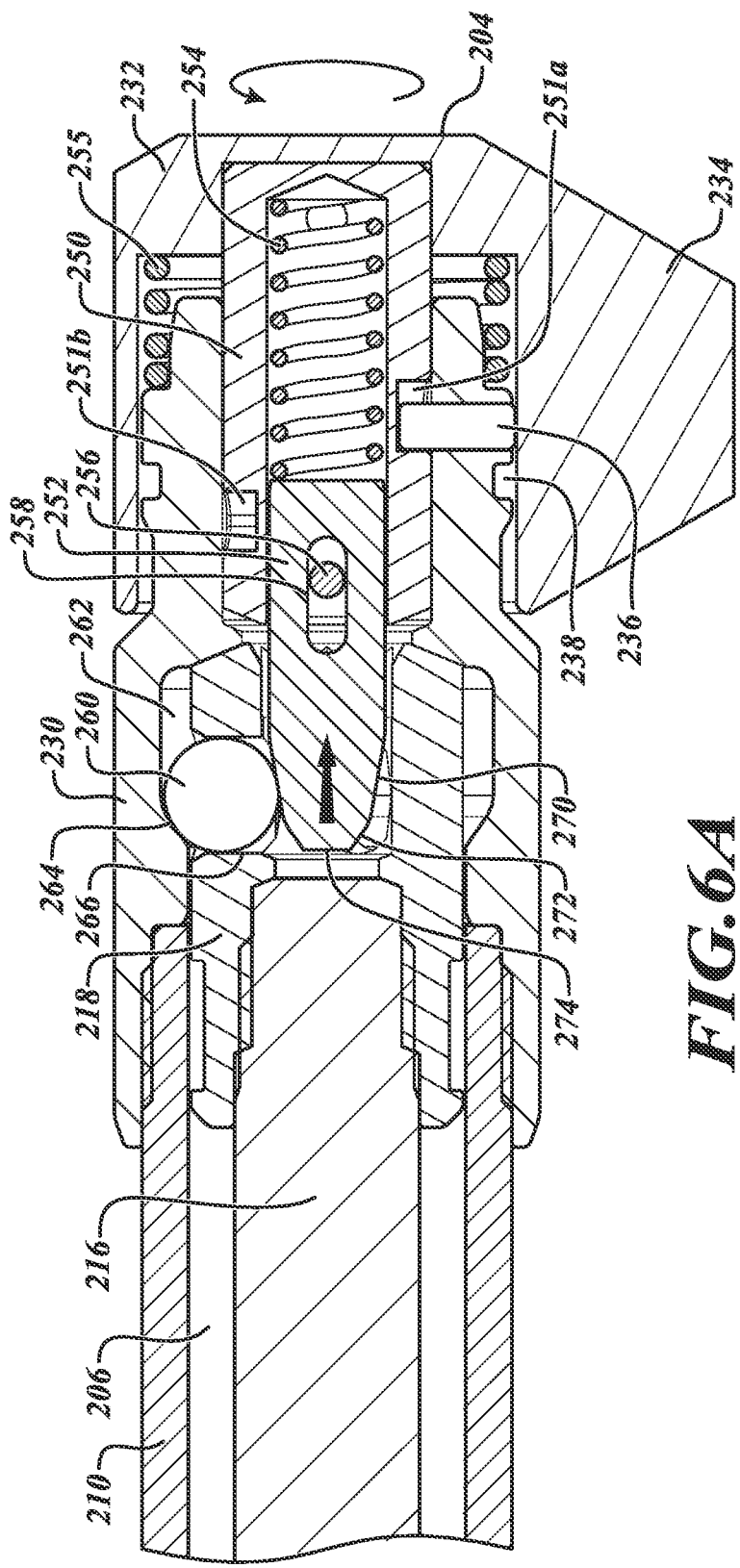
FIGS. 6A-6C are enlarged cross-sectional detail views of the anti-roll bar link of FIG. 5, showing transition from a locked state and parked position to an unlocked state and unparked position anti-roll bar link.
Figure 6B:
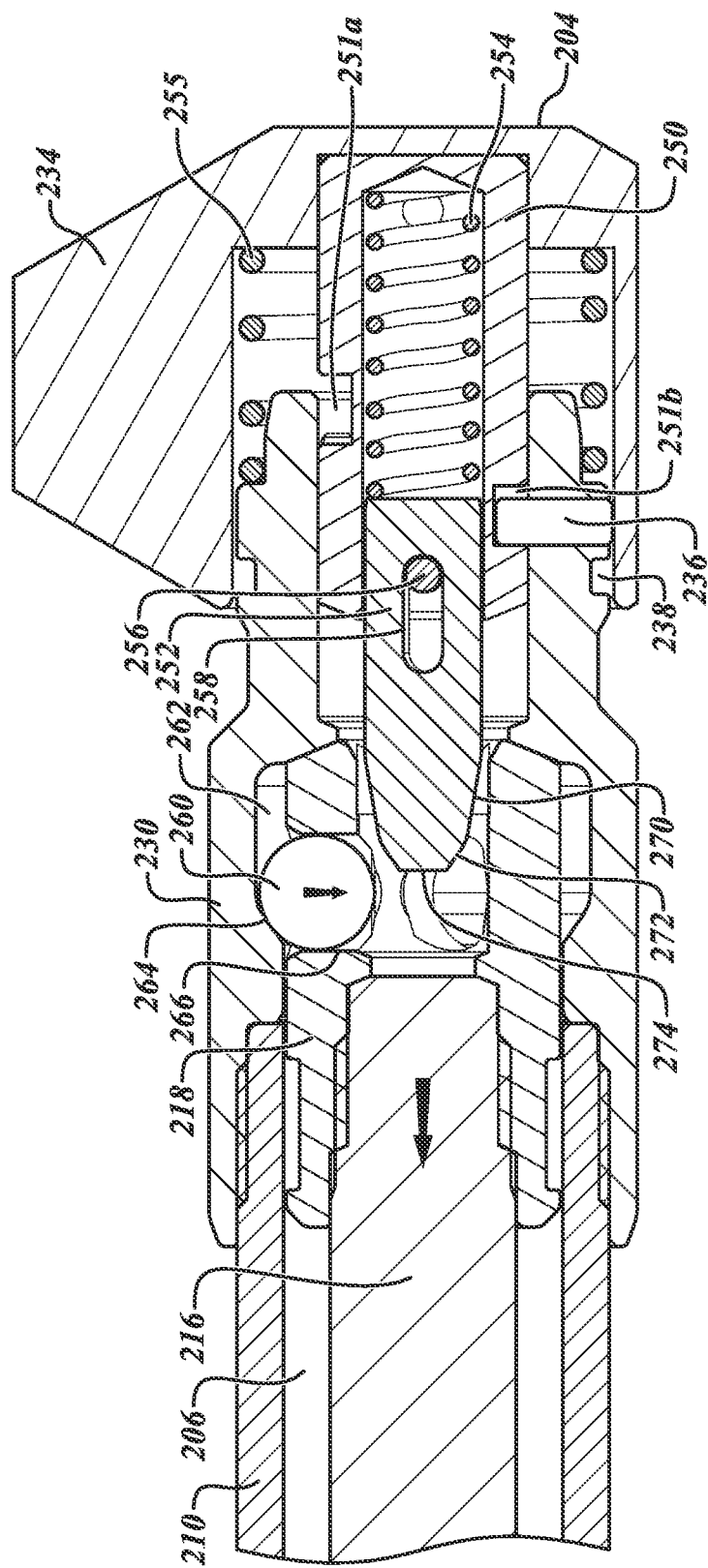
Figure 6C:
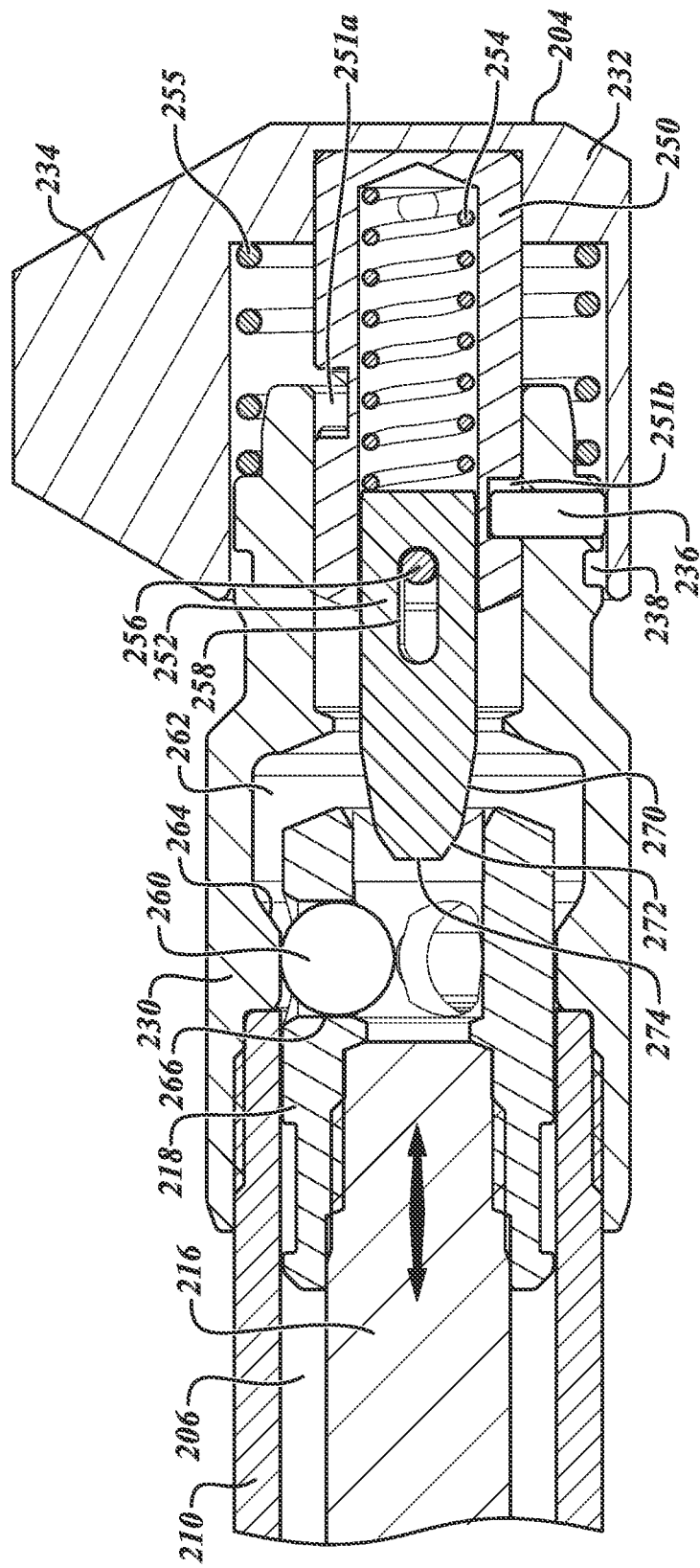

FIGS. 6A-6C show enlarged cross-sectional detail views of the anti-roll bar link 200 in: (1) the locked state and a parked position, transitioning to the unlocked state (FIG. 6A); (2) an unlocked state transitioning away from the parked position (FIG. 6B); and (3) an unlocked state and unparked position (FIG. 6C). The locked state of the anti-roll bar link 200 creates a rigid link between the anti-roll bar ARB and the axle A (see FIG. 2). The anti-roll bar link 200 generally includes a shaft 216 having a retainer guide 218 coupled to a proximal end of the shaft 216. As shown, the shaft 216 may be configured to axially travel within an inner chamber 206. Although not shown, the retainer guide 218 may include a chamber wall seal to prevent gas in the inner chamber 106 from flowing between the proximal and distal sides of the retainer guide 218. In embodiments utilizing hydraulic damping, the retainer guide 218 may include one or more ports (not shown) to allow damping fluid flow between the proximal and distal sides of the retainer guide 218.

Figure 9:
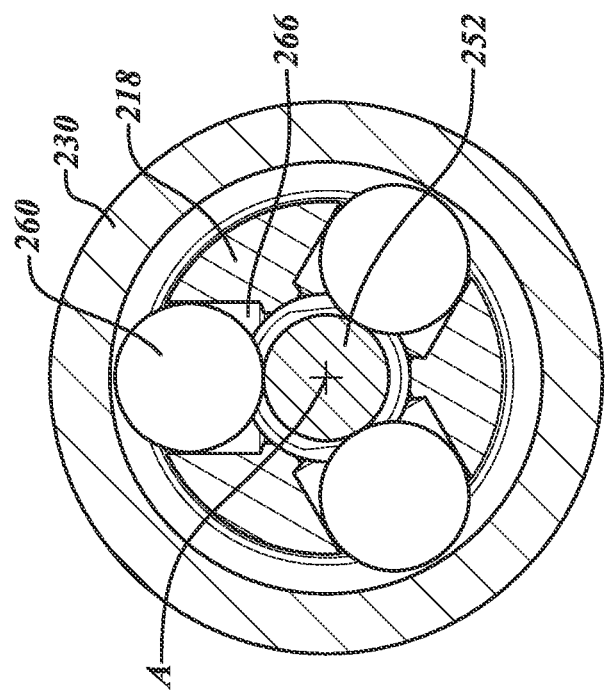
FIG. 9 is a cross-sectional detail view of locking components of the anti-roll bar link of FIG. 5.

Initially referring to FIGS. 6A-6C together, the anti-roll bar link 200 may include a plurality of locking balls 260 that prevent movement of the shaft 216 with respect to the body 210. The locking balls 260 may be generally arranged in a triad configuration, as shown in the cross-section of FIG. 9; however, any suitable ball configuration is within the scope of the present technology (e.g., less or greater than three balls). In FIGS. 6A-7E, only a single locking ball 260 is shown for sake of clarity of illustration. The locking ball 260 may be configured to interface with a portion of the proximal cap 230 and a locking pin 252 and prevent extension of the shaft 216 in the locked state. The locking ball 260 is generally configured to travel within a ball aperture 266 in the retainer guide 218. In the following description the locking ball 260 is shown in various positions within the ball aperture 266, generally traveling radially inward toward a central axis A (see FIG. 9) of the shaft 216 to transition the anti-roll bar link 200 to the unlocked state, and traveling radially outward away from the central axis A to transition the anti-roll bar link 200 to the locked state. As will be described in greater detail below, the locking pin 252 is generally configured to control the radial position of the locking ball 260 with respect to the central axis A by translation along the central axis A, retracting toward the proximal end 204 to unlock the anti-roll bar link 200, and extending toward the distal end 202 to lock the anti-roll bar link 200.

The proximal cap 230 includes an enlarged chamber 262 configured to allow the locking ball 260 to travel radially outward from the central axis A such that the locking ball 260 abuts a sloped wall 264 positioned within the enlarged chamber 262. Together with the locking pin 252, the sloped wall 264 is configured to trap the locking ball 260 to lock the shaft 216 with respect to the body 210. In this regard, the locking ball 260 abuts the sloped wall 264, a locking surface 270 of the locking pin 252, and the ball aperture 266 in the locked state, preventing extension of the shaft 216. As will be explained in greater detail below, the angle of the sloped wall 264 with respect to the locking surface 270 is arranged such that the slopes of the surfaces are converging in a direction generally toward the distal end 202. As such, an increasing tensile force on the anti-roll bar link 200 to extend the shaft 216 will cause the locking ball 260 to be more tightly compressed between the sloped wall 264 and the locking surface 270, thereby increasing the tensile force the anti-roll bar link 200 can withstand in the locked state. Although the enlarged chamber 262 is shown around the entire circumference of the proximal cap 230, in other embodiments, the enlarged chamber may only extend around a portion of the circumference of the proximal cap 230, such that individual enlarged chambers correspond to each of the locking balls 260.

The locking pin 252 translates axially to transition the anti-roll bar link 200 between the locked and unlocked states. The locking pin 252 can be translated both by the selector cap 232 and by contact with the locking balls 260 (e.g., against a parking surface 272 of the locking pin 252 positioned adjacent to the locking surface 270 and a tip 274) during parking and locking of the anti-roll bar link 200, which will be described in greater detail below with reference to FIGS. 7A-7E. The selector cap 232 is rotated to transition the anti-roll bar link 200 between the locked and unlocked states. The selector cap 232 at least partially overlaps the proximal cap 230 in a concentric manner such that the selector cap 232 can rotate and axially translate with respect to the proximal cap 230. The interface between the proximal cap 230 and the selector cap 232 may be substantially sealed with a gasket or O-ring (not shown) placed in an O-ring trough 238 formed in the proximal cap 230.

Figure 8:
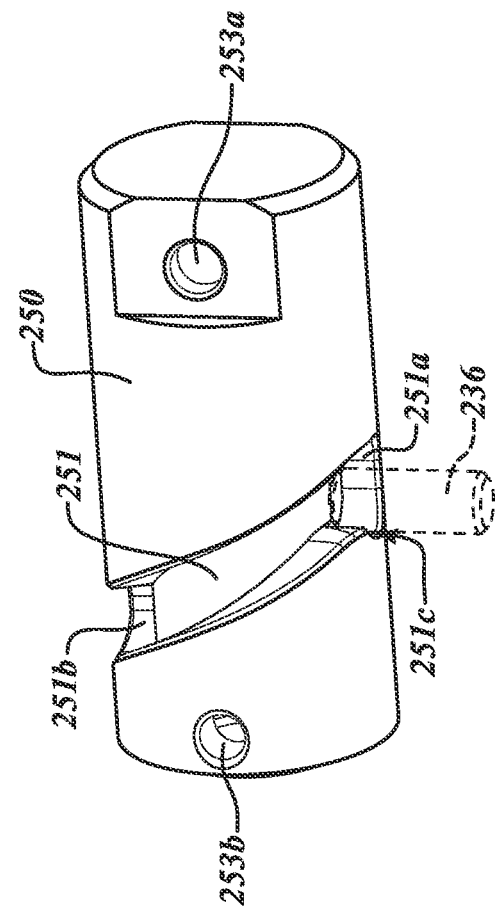
FIG. 8 is a perspective detail view of a pin retractor of the anti-roll bar link of FIG. 5.

The selector cap 232 may be coupled to a pin retractor 250 by a fastener (e.g., a set pin 233, see FIG. 5) extending through an orifice 253a (see FIG. 8), thereby causing rotation of the pin retractor 250 when the selector cap 232 is rotated by applying a force to the rotation protrusion 234 in the direction of the rotational arrow in FIG. 6A. The selector cap 232 together with the pin retractor 250 may be configured to translate axially with respect to the proximal cap 230 to change the axial position of the locking pin 252. As shown in FIGS. 6A-6C, and with reference to FIG. 8, the pin retractor 250 has a helical slot 251 positioned on an external surface of the pin retractor 250. The helical slot 251 generally has a first end 251a, which may have a detent portion 251c, and a second end 251b. The first end 251a corresponds to the locked state with the locking pin 252 extended toward the distal end 202 within the proximal cap 230. The second end 251b corresponds to the unlocked state with the locking pin 252 retracted toward the proximal end 204 within the proximal cap 230. In some embodiments, the detent portion 251c is included at the first end 251a to prevent inadvertent unlocking of the anti-roll bar link 200, by requiring that a spring force holding the selector cap 232 in the detent portion 251c is first overcome prior to transitioning away from the locked state.

The helical slot 251 may be configured to cause the pin retractor 250 to axially translate along the central axis A as the pin retractor 250 is rotated by the selector cap 232. The proximal cap 230 includes a fixed dowel pin 236 positioned to travel within the helical slot 251 and effectuate axial translation of the pin retractor 250 during rotation. A selector cap spring 255 may be positioned between the proximal cap 230 and the selector cap 232 to bias the selector cap 232, the pin retractor 250, and the locking pin 252 toward the proximal end 204 and retain the dowel pin 236 within the detent portion 251c of the helical slot 251. As the selector cap 232 rotates away from the locked state with the dowel pin 236 positioned in the detent portion 251c, the selector cap 232, pin retractor 250, and locking pin 252 initially translate axially toward the distal end 202, compressing the selector cap spring 255. The rotational force required to overcome the spring force of the selector cap spring 255 may prevent inadvertent unlocking of the anti-roll bar link 200. Once the dowel pin 236 travels out of the detent portion 251c and is positioned at the first end 251a of the helical slot 251, further rotation of the selector cap 232 will cause the dowel pin 236 to travel along the helical slot 251 toward the second end 251b, thereby causing the pin retractor 250, the selector cap 232, and the locking pin 252 together to translate axially toward the proximal end 204 until the dowel pin 236 reaches the second end 251b, retracting the locking pin 252 to the unlocked state (compare the position of the components in FIGS. 6A and 6B).

In addition to the axial translation of the locking pin 252 with the pin retractor 250, the locking pin 252 may also be configured to axially translate independently with respect to the pin retractor 250. In this regard, the locking pin 252 may include a slot 258 configured to receive a retaining pin 256 extending through an aperture 253b (see FIG. 8) of the pin retractor 250. The interface of the slot 258 with the retaining pin 256 allows constrained axial translation of the locking pin 252 with respect to the pin retractor 250. As shown, the pin retractor 250 may include a locking pin spring 254 configured to bias the locking pin 252 toward a position fully extended from the pin retractor 250 in the direction of the distal end 202. During various locking, unlocking, and parking states of the anti-roll bar link 200, the locking pin 252 may be axially translated to different positions with respect to the pin retractor 250 to allow the anti-roll bar link 202 transition between each of the various stages.

The transition of the anti-roll bar link 200 from the locked state and parked position shown in FIG. 6A to the unlocked state and unparked position shown in FIG. 6C will now be described in greater detail. Referring initially to FIG. 6A, the anti-roll bar link 200 is in the locked state and parked position with the locking ball 260 abutting the sloped surface 264, the ball aperture 266, and the locking surface 270 to prevent extension of the shaft 216 with respect to the body 210. When a tensile force is applied to the anti-roll bar link 200, the captured position of the locking balls 260 in FIG. 6A applies a compressive force against the locking pin 252 as a result of the slope of the sloped surface 264. In the triad configuration shown in FIG. 9, the three locking balls 260 (one identified) will generally provide a balanced compressive force against the locking pin 252 which prevents bending of the locking pin 252 and/or increased friction between the locking pin 252 and the pin retractor 250. As noted above, the slopes of the sloped surface 264 and the locking surface 270 generally converge in a direction toward the distal end 202, which causes increased compression forces on the locking ball 260 as a tensile force is applied to the anti-roll bar link 200.

To transition the anti-roll bar link 200 away from the locked state, the selector cap 232 may be rotated as indicated by the arrow in FIG. 6A (e.g., counterclockwise as viewed from the proximal end 204). The initial stage of the rotation of the selector cap 232 causes the dowel pin 236 to move within the detent portion 251c of the helical slot 251. The path of the detent portion 251c initially causes the selector cap 232 and the pin retractor 250 to axially translate toward the distal end 202, with resistance from the selector cap spring 255. As a result of the constrained locking ball 260, this movement of the pin retractor 250 will not axially translate the locking pin 252 toward the distal end 202. Instead, the locking pin 252 will retract within the pin retractor 250 and maintain contact with the locking ball 260.

After the dowel pin 236 exits the detent portion 251c at the first end 251a, further rotation of the selector cap 232 will cause the selector cap 232 and the pin retractor 250 to axially translate toward the proximal end 204. During such movement, the locking pin spring 254 will bias the locking pin 252 toward the distal end 202 and maintain contact with the locking ball 260 until the retaining pin 256 reaches the end of the slot 258. The configuration of the retaining pin 256 and the slot 258 may cause the locking pin 252 to rotate with the selector cap 232 during unlocking of the anti-roll bar link 200. Upon the retaining pin 256 reaching the end of the slot 258, further rotation of the selector cap 232 toward the unlocked state will cause the locking pin 252 to retract with the pin retractor 250 and the selector cap 232 toward the proximal end 204.

Referring now to FIG. 6B, the selector cap 232 is shown in the fully unlocked rotational position such that the pin retractor 250 has been rotated until the dowel pin 236 reaches the second end 251b and prevents further rotation of the selector cap 232 and the pin retractor 250. In the illustrated embodiments, the rotation of the components to reach the unlocked state at the second end 251b is about 180° of rotation; however, in other embodiments, any amount of rotation of the components is within the scope of the present technology. As shown in FIG. 6B, as the locking pin 252 is retracted with the pin retractor 250 and the selector cap 232, the locking ball 260 no longer abuts the locking surface 270 and is free to travel radially inward toward the central axis A and out of contact with the sloped surface 264. In the illustrated state, the locking pin 252 will generally be fully extended from the pin retractor 250 toward the distal end 202 as a result of the locking pin spring 254 biasing the locking pin 252. As a locking ball 260 moves radially inward away from the sloped surface 264, in some configurations the locking ball 260 may contact the locking pin 252 prior to fully releasing from the sloped surface 264. In these embodiments, the locking ball 260 may contact the parking surface 272 and/or the tip 274 and apply a retraction force against the locking pin 252 to axially translate the locking pin 252 within the pin retractor 250 toward the proximal end 204.

Referring now to FIG. 6C, the anti-roll bar link 200 is shown transitioning away from the parked position of FIGS. 6A and 6B such that the shaft 216 is free to translate axially with respect to the body 210 and provide compliance to the anti-roll bar ARB system. As shown, the locking ball 260 is moved radially inward toward the central axis A within the ball aperture 266, such that the locking ball 260 no longer interfaces with the sloped surface 264. As long as the selector cap 232 remains in the unlocked position with the dowel pin 236 at the second end 251b, returning the shaft 216 to the parked position (e.g., fully retracted toward the proximal end 204) will not cause the locking ball 260 to become constrained and lock the shaft 216 with respect to the body 210. In this regard, the retainer guide 218 may contact the proximal cap 230 and the locking ball 260 will be able to move radially within the ball aperture 266 and may contact the sloped surface 264, but the locking pin 252 will not prevent the locking ball 260 from moving radially inward, such that the anti-roll bar link 200 remains unlocked.

Figure 7A:
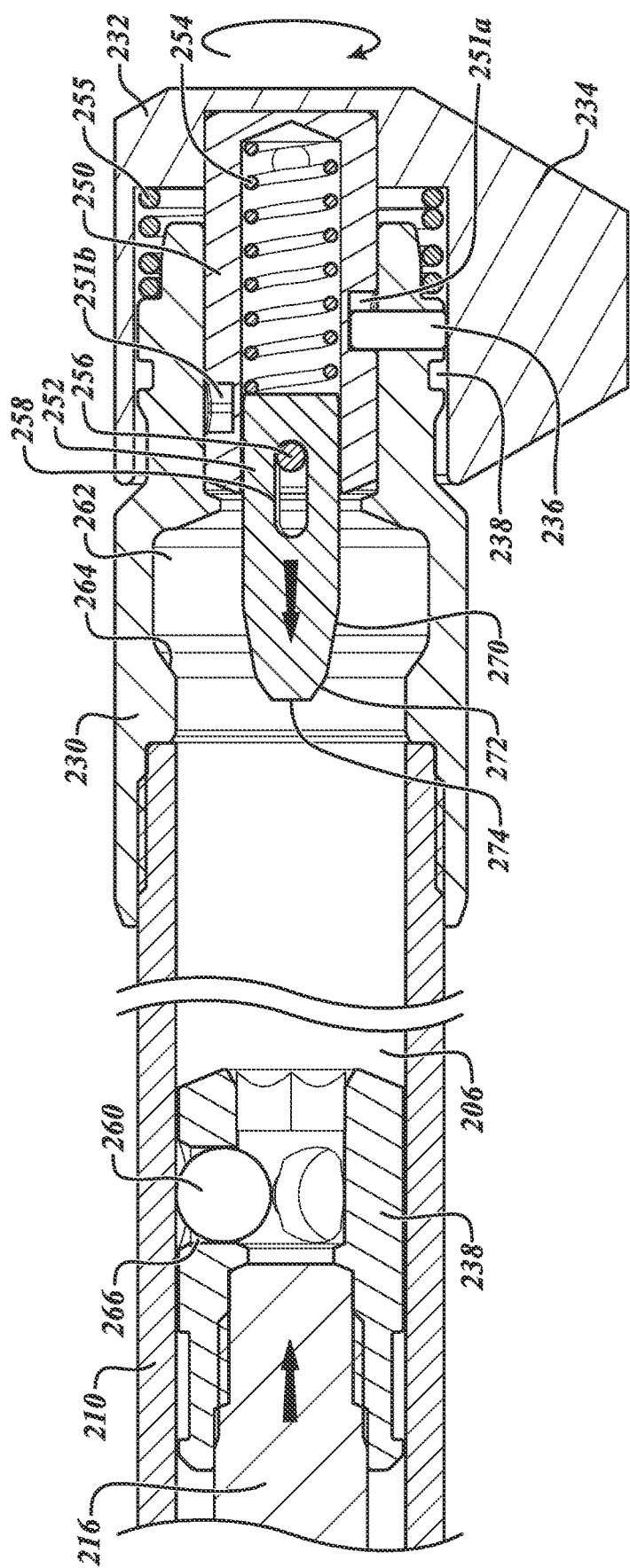
FIGS. 7A-7E are enlarged cross-sectional detail views of the anti-roll bar link of FIG. 5, showing transition from the unlocked state and unparked position to the locked state and parked position anti-roll bar link.
Figure 7B:
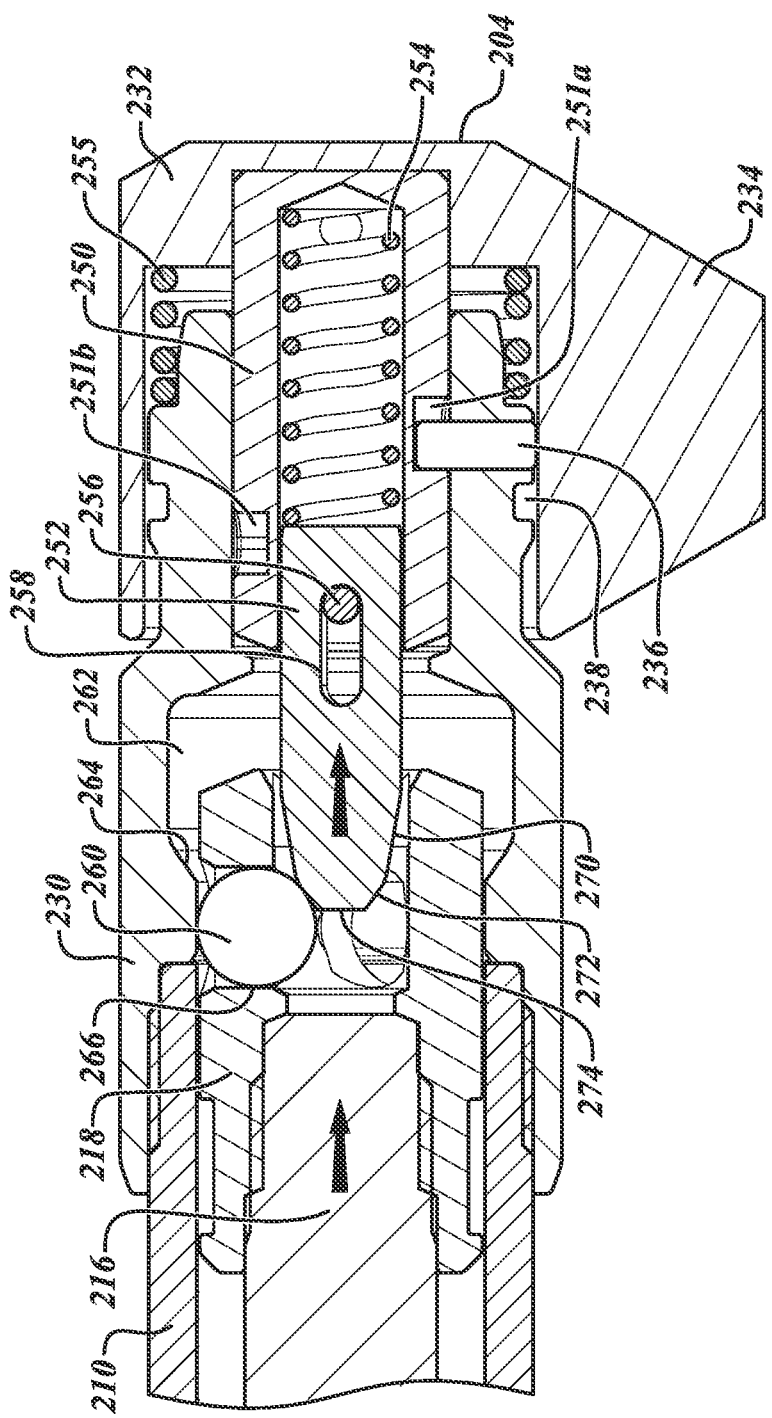
Figure 7C:
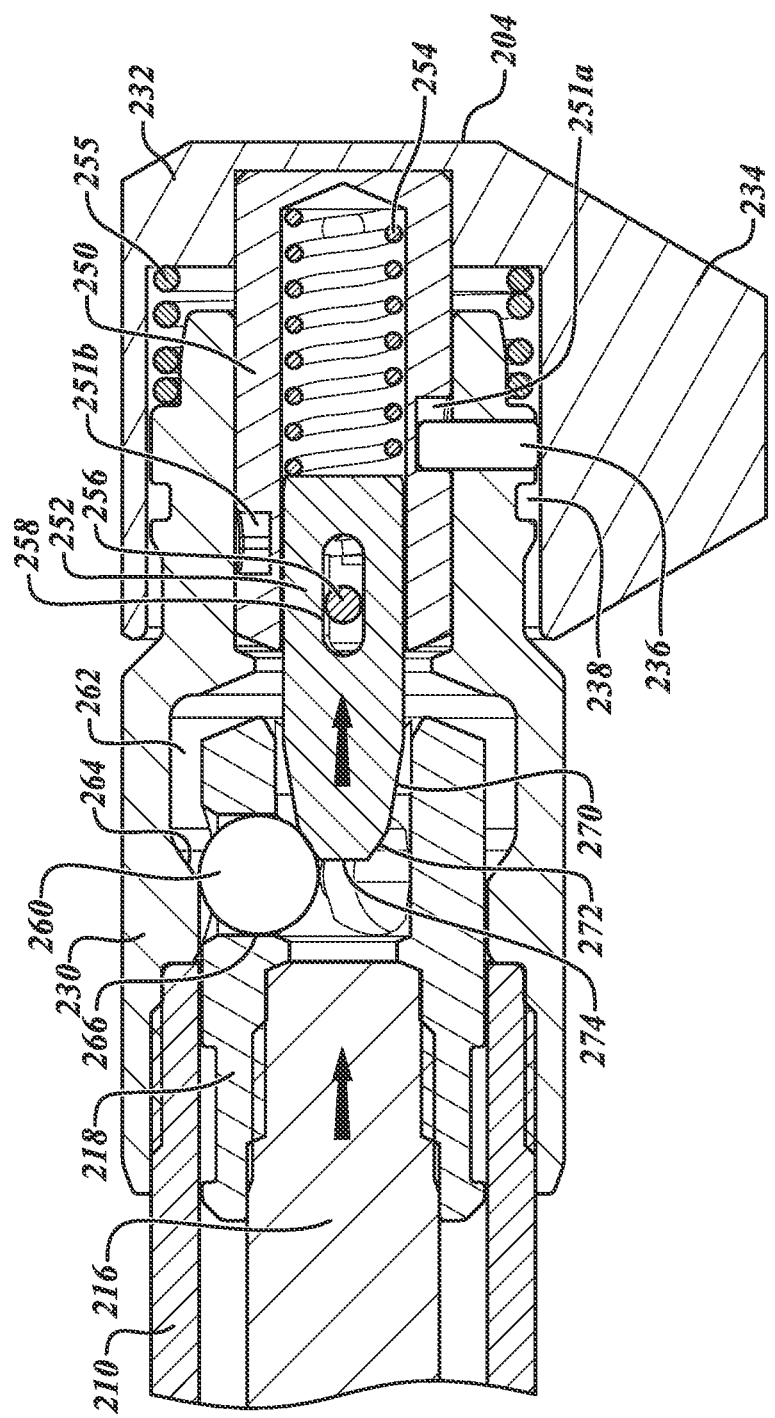
Figure 7D:
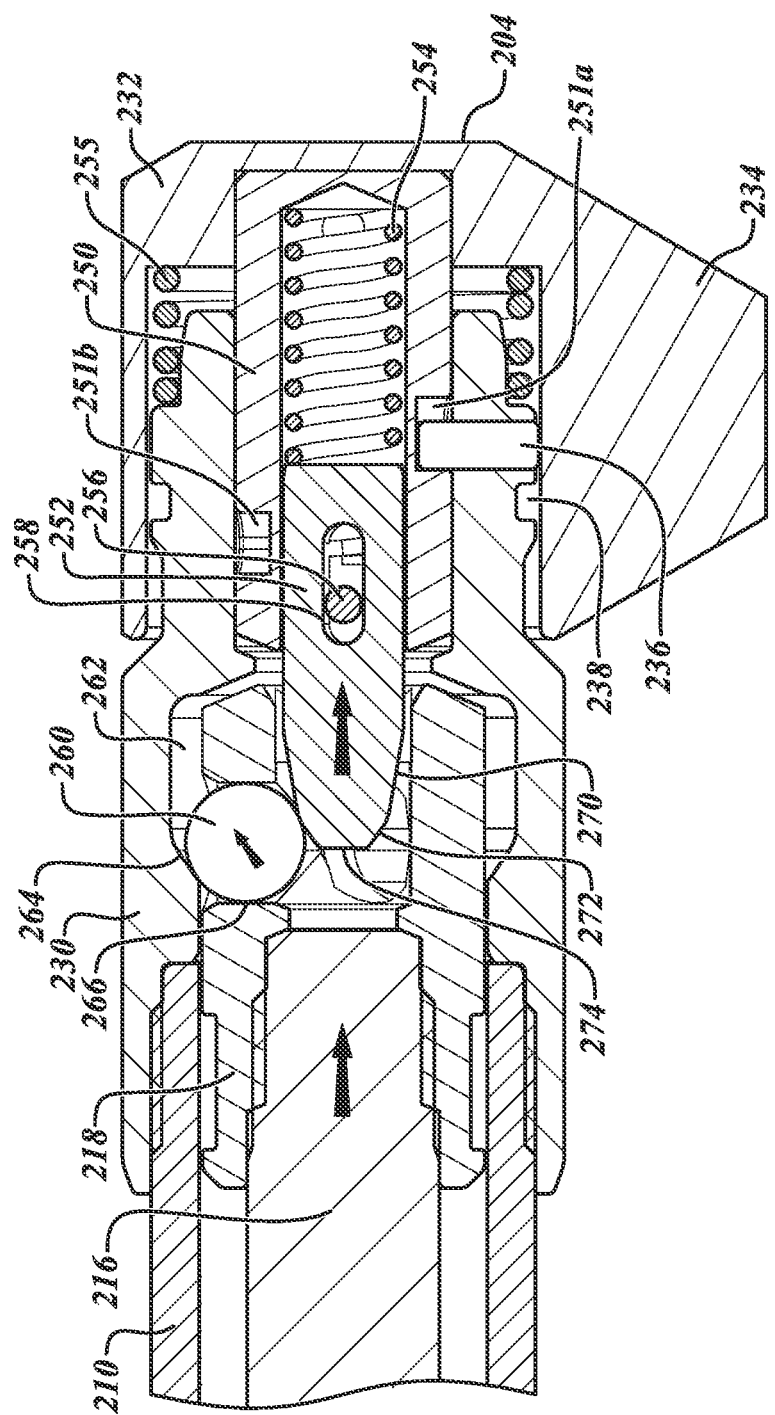
Figure 7E:
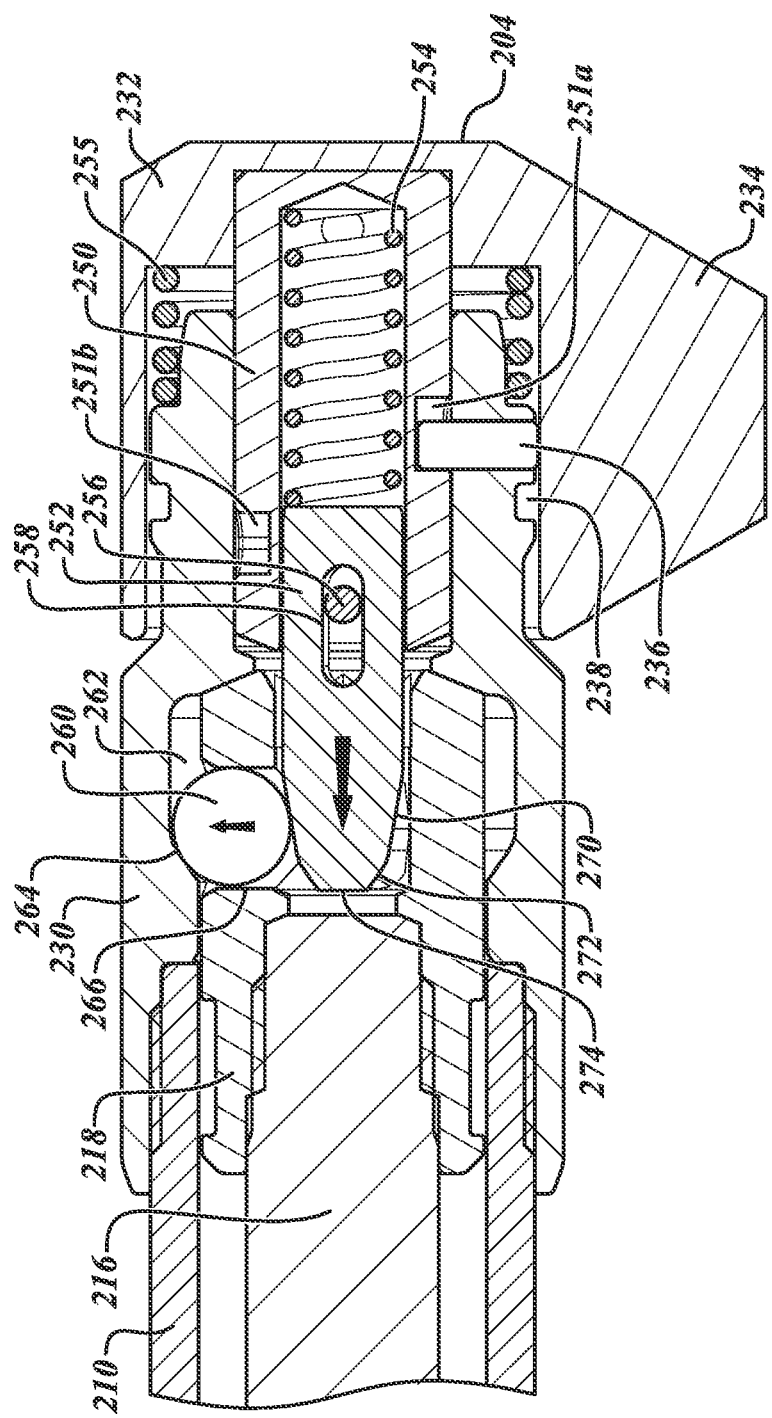

FIGS. 7A-7E show enlarged cross-sectional detail views of the anti-roll bar link 200 in: (1) the unlocked state and unparked position, transitioning to the parked position with the selector cap 232 in the locked position (FIGS. 7A-7D); and (2) the locked state and parked position (FIG. 7E). The transition of the anti-roll bar link 200 from the unlocked state and unparked position shown in FIG. 7A to the locked state and parked position shown in FIG. 7E will now be described in greater detail. Referring initially to FIG. 7A, the shaft 216 of the anti-roll bar link 200 is shown in an intermediate position with respect to the body 210, such as would be common during unlocked use of the anti-roll bar link 200. To return the anti-roll bar link 200 to the locked state and the parked position, the selector cap 232 is rotated to move the dowel pin 236 away from the second end 251b toward the first end 251a and into the detent portion 251c. As noted above, the spring force of the selector cap spring 232 can retain the dowel pin 236 within the detent portion 251c to prevent inadvertent unlocking.

As noted above, a force may be applied to urge the anti-roll bar link 200 toward the parked position to aid in parking and locking movement of the anti-roll bar link 200. As with the anti-roll bar link 100, the portion of the inner chamber 206 on the distal side of the retainer guide 218 may be pressurized with a gas and configured to provide a restoring force to urge the shaft 216 toward the proximal end 204 to the parked position. In other embodiments, parking may be promoted by a force applied by a coil spring, air spring, weight, hydraulic actuator, electric actuator, force generator, etc. positioned between a component of the vehicle, suspension, and/or anti-roll bar system and the anti-roll bar ARB.

Referring now to FIG. 7B, continued retraction of the shaft 216 toward the proximal end 204 causes the locking ball 260 to contact the parking surface 272 of the locking pin 252. As the shaft 216 continues to retract after such contact, the locking ball 260 will cause the locking pin 252 to retract within the pin retractor 250 and compress the locking pin spring 254. This axial translation of the locking pin 252 is constrained by the retaining pin 256 and is permitted to translate axially until the retaining pin 256 contacts an end of the slot 258. In this regard, the slot 258 may be sized to allow enough axial translation of the locking pin 252 such that the locking ball 260 can enter the enlarged chamber 262 and lock the anti-roll bar link 200.

Referring now to FIGS. 7C and 7D, continued retraction of the shaft 216 toward the proximal end 204 causes further axial translation of the locking pin 252 within the pin retractor 250. As shown, the slope of the parking surface 272 with respect to the central axis A is substantially similar to the slope of the sloped surface 264 and generally greater than the slope of the locking surface 270. In this regard, as the locking pin 252 further retracts within the pin retractor 250, the distance between the parking surface 272 and the sloped surface 264 will become greater than or equal to the diameter of the locking ball 260, at which point the locking ball 260 will begin to enter the enlarged chamber 262 and contact the sloped surface 264. As shown in FIG. 7D, the shaft 216 is near the parked position and the locking ball 260 can move radially outward from the central axis A and axially toward the proximal end 204 to fully enter the enlarged chamber 262 and contact the sloped surface 264. As the locking ball 260 moves radially outward, the locking ball 260 will transition from contact with the parking surface 272 to contact with the locking surface 270.

Referring now to FIG. 7E, the locking ball 260 has moved radially outward from the central axis A to contact the sloped surface 264. During the radially outward movement of the locking ball 260, clearance between the locking ball 260 and the locking pin 252 will allow the locking pin spring 254 to axially translate the locking pin 252 toward the distal end 202 away from the pin retractor 250. The spring force causing translation of the locking pin 252 will also urge the locking ball 260 to the furthest radially outward position, capturing the locking ball between the sloped surface 264, the locking surface 270, and the ball aperture 266, and returning the anti-roll bar link 200 to the locked state in the parked position.

The anti-roll bar link 200 may include a manual locking and unlocking feature, e.g., the selector cap 232, allowing the user to control the state of the anti-roll bar link, and/or may have an automated feature (e.g., an actuator, servo, etc.) toggled by a controller. In hybrid configurations, the manual feature may override the automated feature, or the automated feature may override the manual feature, e.g., automatically locking the anti-roll bar link when the vehicle reaches a certain speed threshold, manually overriding the automated feature with confirmed driver input, etc.

In the foregoing description, specific details are set forth to provide a thorough understanding of exemplary embodiments of the present technology. It should be apparent to one skilled in the art, however, that the embodiments disclosed herein may be practiced without embodying all of the specific details. In some instances, well-known process steps have not been described in detail in order not to unnecessarily obscure various aspects of the present technology.

Further, it should be appreciated that embodiments of the present technology may employ any combination of features described herein. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

The present application may include references to directions, such as "forward," "rearward," "front," "rear," "upward," "downward," "top," "bottom," "right hand," "left hand," "proximal," "distal," "in," "out," "extended," etc. The reference terms "proximal" and "distal" are intended to generally relate to the position of the anti-roll bar link in the orientation shown in FIG. 2, where the lower end, having the selector cap, would typically be physically farther from the driver of the vehicle; however, in other orientations within the scope of the present technology, the distal end may be closer to the driver than the proximal end. These references, and other similar references in the present application, are only to assist in helping describe and to understand the particular embodiment and are not intended to limit the present technology to these directions or locations. The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number, and is meant to be any number that is more than one, for example, two, three, four, five, etc.

For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. An anti-roll bar link for a vehicle suspension, the anti-roll bar link comprising: an elongate body having a proximal end portion and an inner chamber extending to the proximal end portion; a shaft configured to be received within the inner chamber and axially translate with respect to the elongate body; a piston coupled to an end of the shaft such that axial translation of the shaft causes the piston to travel along the inner chamber; and a locking protrusion extending from the end of the shaft and away from the piston toward the proximal end portion of the elongate body, the locking protrusion having a proximal tip and a locking aperture extending transversely through the proximal tip, wherein the locking aperture is positioned to receive a locking pin and lock the axial position of the shaft with respect to the elongate body.

2. The anti-roll bar link of claim 1, further comprising a cap coupled to the proximal end portion of the elongate body, the cap having a locking cavity configured to at least partially receive the proximal tip of the locking protrusion therein, wherein the cap has an aperture extending radially from the locking cavity to an external surface.

3. The anti-roll bar link of claim 2, wherein the aperture of the cap is configured to axially align with the locking aperture of the locking protrusion when the anti-roll bar link is in a parked position, and wherein the locking pin is inserted through the aperture of the cap and the locking aperture to lock the axial position of the shaft with respect to the elongate body to place the anti-roll bar link in a locked state.

4. The anti-roll bar link of claim 3, wherein the aperture of the cap extends bidirectionally from the locking cavity through the cap such that the locking pin can be inserted entirely through the cap in the locked state.

5. The anti-roll bar link of claim 4, further comprising a clip associated with the locking pin and configured to interface with one of the ends of the locking pin to retain the locking pin within the aperture of the cap.

6. The anti-roll bar link of claim 1, wherein a portion of the inner cavity on a distal side of the piston is pressurized with a gas to urge the locking aperture into alignment with the aperture of the cap.

7. The anti-roll bar link of claim 6, wherein the piston further comprises a seal to prevent flow of the pressurized gas from the distal side of the piston to a proximal side of the piston.

8. The anti-roll bar link of claim 1, further comprising a distal mount fixedly coupled to a distal end of the shaft and a proximal mount couplable to an intermediate axial position on the elongate body.

9. The anti-roll bar link of claim 8, wherein the elongate body further comprises a plurality of circumferential indentations corresponding to axial positioning features of the proximal mount on the elongate body, and wherein the proximal mount is configured to interface with at least one of the plurality of circumferential indentations to axially fix the proximal mount with respect to the elongate body.

10. An anti-roll bar link for a vehicle suspension, the anti-roll bar link comprising: an elongate body having an inner chamber extending axially along the elongate body and an enlarged chamber positioned near a proximal end portion of the elongate body, the enlarged chamber having a sloped surface; a shaft configured to be received within the inner chamber and axially translate with respect to the elongate body; a retainer guide coupled to an end of the shaft and having a ball aperture; and a locking ball radially movable in the ball aperture with respect to the retainer guide, wherein the locking ball is configured to selectively engage with the sloped surface of the enlarged chamber in a parked position of the anti-roll bar link to lock the axial position of the shaft with respect to the elongate body.

11. The anti-roll bar link of claim 10, further comprising a locking pin having a locking surface, wherein the locking pin is selectively extendable from the proximal end portion to a position where the locking surface retains the locking ball against the sloped surface of the enlarged chamber to place the anti-roll bar link in a locked state in which the axial position of the shaft is locked with respect to the elongate body.

12. The anti-roll bar link of claim 11, further comprising a cap coupled to and extending from the proximal end portion of the elongate body, the cap having the enlarged cavity therein, wherein the cap is configured to axially receive a pin retractor that is rotatable and translatable with respect to the cap, and wherein the locking pin is slidingly associated with the pin retractor.

13. The anti-roll bar link of claim 12, wherein the cap has a dowel pin fixed with respect to the cap, wherein the dowel pin projects into a helical slot positioned on an external surface of the pin retractor such that rotation of the pin retractor with respect to the cap causes the dowel pin to travel within the helical slot and axially translate the pin retractor with respect to the cap.

14. The anti-roll bar link of claim 13, wherein the helical slot comprises a first end at which the dowel pin is positioned to correspond to the locked state of the anti-roll bar link and a second end at which the dowel pin is positioned to correspond to an unlocked state of the anti-roll bar link.

15. The anti-roll bar link of claim 14, wherein the first end of the helical slot has a detent portion configured to prevent inadvertent transitioning of the anti-roll bar link away from the locked state.

16. The anti-roll bar link of claim 15, further comprising a spring configured to bias the pin retractor toward the proximal end portion and retain the dowel pin within the detent portion.

17. The anti-roll bar link of claim 12, further comprising a selector cap rotatably associated with a proximal end portion of the cap and configured such that rotation of the selector cap causes transition the anti-roll bar link between the locked state and an unlocked state in which the shaft is permitted to translate axially with respect to the elongate body.

18. The anti-roll bar link of claim 17, wherein the selector cap is rotationally coupled to the pin retractor such that rotation of the selector cap causes rotation of the pin retractor.

19. The anti-roll bar link of claim 12, wherein the locking pin has an axial slot configured to receive a pin coupled to the pin retractor and permit axial translation of the locking pin with respect to the pin retractor.

20. The anti-roll bar link of claim 11, wherein a slope of the sloped surface with respect to a central axis of the shaft and a slope of the locking surface of the locking pin with respect to the central axis converges at a point directionally toward a distal end of the elongate body from the locking pin.

21. The anti-roll bar link of claim 11, wherein the locking pin further comprises a parking surface positioned adjacent to the locking surface.

22. The anti-roll bar link of claim 21, wherein the parking surface is configured to abut the locking ball when the locking pin is in the position in the locked state as the shaft is axially translated toward the proximal end, and wherein the locking pin is configured to retract as the shaft reaches the parked position to permit radial movement of the locking ball in the ball aperture to engage with the sloped surface and lock the axial position of the shaft with respect to the elongate body.

23. The anti-roll bar link of claim 22, further comprising a spring configured to bias the locking pin toward a distal end of the elongate body such that radial movement of the ball into the enlarged chamber causes the locking pin to translate toward the distal end and engage the locking surface with the locking ball.

24. An anti-roll bar link for a vehicle suspension, the anti-roll bar link comprising: an elongate body having an inner chamber extending axially along the elongate body; a shaft assembly configured to be received within the inner chamber and to axially translate with respect to the elongate body, the shaft assembly configured to slidably contact the elongate body such that a distal portion of the inner chamber contains pressurized fluid; and a cap assembly coupled to a proximal end of the elongate body, the cap assembly having a locked configuration for fixedly holding the shaft assembly and unlocked configuration for allowing the shaft assembly to travel along the inner chamber such that the pressurized fluid provides dampening, wherein the cap assembly is spaced apart from an anti-roll bar mount region of the elongate body such that the cap assembly is manually accessible and reconfigurable between the locked configuration and the unlocked configuration when installed.

25. The anti-roll bar link of claim 24, wherein the shaft assembly includes a retainer guide and a locking ball, wherein the locking ball is configured to selectively engage with the cap assembly to lock an axial position of the shaft with respect to the elongate body.

26. The anti-roll bar link of claim 24, further comprising a cap coupled to the proximal end portion of the elongate body, the cap assembly having a locking protrusion extending from an end of the shaft assembly and having a proximal tip, the locking protrusion having a locking aperture extending transversely through the proximal tip, wherein the locking aperture is positioned to receive a locking pin to thereby lock the axial position of the shaft assembly with respect to the elongate body, wherein the cap assembly has a locking cavity configured to at least partially receive the proximal tip of the locking protrusion therein, and wherein the cap assembly has an aperture extending radially from the locking cavity to an external surface.

27. The anti-roll bar link of claim 26, wherein the aperture of the cap assembly is configured to axially align with the locking aperture of the locking protrusion when the anti-roll bar link is in a parked position, and wherein the locking pin is inserted through the aperture of the cap assembly and the locking aperture to thereby lock the axial position of the shaft with respect to the elongate body to place the anti-roll bar link in a locked state.

28. The anti-roll bar link of claim 27, wherein the aperture of the cap assembly extends bidirectionally from the locking cavity through the cap assembly such that the locking pin can be inserted entirely through the cap assembly in the locked state.

29. The anti-roll bar link of claim 28, further comprising a clip associated with the locking pin and configured to interface with one of the ends of the locking pin to retain the locking pin within the aperture of the cap assembly.

30. The anti-roll bar link of claim 25, wherein a portion of the inner cavity on a distal side of the piston is pressurized with a gas to urge the locking aperture into alignment with the aperture of the cap.

31. The anti-roll bar link of claim 30, wherein the piston further comprises a seal to prevent flow of the pressurized gas from the distal side of the piston to a proximal side of the piston.

32. The anti-roll bar link of claim 25, further comprising a distal mount fixedly coupled to a distal end of the shaft and a proximal mount couplable to an intermediate axial position on the elongate body.

33. The anti-roll bar link of claim 32, wherein the elongate body further comprises a plurality of circumferential indentations corresponding to axial positioning features of the proximal mount on the elongate body, and wherein the proximal mount is configured to interface with at least one of the plurality of circumferential indentations to axially fix the proximal mount with respect to the elongate body.

34. The anti-roll bar link of claim 24, wherein the shaft assembly includes an elongate shaft, a piston coupled to the shaft, and a locking protrusion configured to be coupled to the cap assembly by a pin.

35. The anti-roll bar link of claim 34, further comprising a locking pin having a locking surface, wherein the locking pin is selectively extendable from the proximal end portion to a position where the locking surface retains the locking ball against the sloped surface of the enlarged chamber to place the anti-roll bar link in a locked state in which the axial position of the shaft is locked with respect to the elongate body.

36. The anti-roll bar link of claim 35, further comprising a cap coupled to and extending from the proximal end portion of the elongate body, the cap having the enlarged cavity therein, wherein the cap is configured to axially receive a pin retractor that is rotatable and translatable with respect to the cap, and wherein the locking pin is slidingly associated with the pin retractor.

37. The anti-roll bar link of claim 36, wherein the cap has a dowel pin fixed with respect to the cap, wherein the dowel pin projects into a helical slot positioned on an external surface of the pin retractor such that rotation of the pin retractor with respect to the cap causes the dowel pin to travel within the helical slot and axially translate the pin retractor with respect to the cap.

38. The anti-roll bar link of claim 37, wherein the helical slot comprises a first end at which the dowel pin is positioned to correspond to the locked state of the anti-roll bar link and a second end at which the dowel pin is positioned to correspond to an unlocked state of the anti-roll bar link.

39. The anti-roll bar link of claim 38, wherein the first end of the helical slot has a detent portion configured to prevent inadvertent transitioning of the anti-roll bar link away from the locked state.

40. The anti-roll bar link of claim 39, further comprising a spring configured to bias the pin retractor toward the proximal end portion and retain the dowel pin within the detent portion.

41. The anti-roll bar link of claim 36, further comprising a selector cap rotatably associated with the a proximal end portion of the cap and configured such that rotation of the selector cap causes transition the anti-roll bar link between the locked state and an unlocked state in which the shaft is permitted to translate axially with respect to the elongate body.

42. The anti-roll bar link of claim 41, wherein the selector cap is rotationally coupled to the pin retractor such that rotation of the selector cap causes rotation of the pin retractor.

43. The anti-roll bar link of claim 36, wherein the locking pin has an axial slot configured to receive a pin coupled to the pin retractor and permit axial translation of the locking pin with respect to the pin retractor.

44. The anti-roll bar link of claim 34, wherein a slope of the sloped surface with respect to a central axis of the shaft and a slope of the locking surface of the locking pin with respect to the central axis converges at a point directionally toward a distal end of the elongate body from the locking pin.

45. The anti-roll bar link of claim 34, wherein the locking pin further comprises a parking surface positioned adjacent to the locking surface.

46. The anti-roll bar link of claim 45, wherein the parking surface is configured to abut the locking ball when the locking pin is in the position in the locked state as the shaft is axially translated toward the proximal end, and wherein the locking pin is configured to retract as the shaft reaches a parked position to permit radial movement of the locking ball in the ball aperture to engage with the sloped surface and lock the axial position of the shaft with respect to the elongate body.

47. The anti-roll bar link of claim 46, further comprising a spring configured to bias the locking pin toward a distal end of the elongate body such that radial movement of the ball into the enlarged chamber causes the locking pin to translate toward the distal end and engage the locking surface with the locking ball.

\* \* \* \* \*